(12) United States Patent
Petrovski et al.

(10) Patent No.: US 10,414,302 B2
(45) Date of Patent: Sep. 17, 2019

(54) CLIMATE CONTROL SYSTEMS AND METHODS

(71) Applicant: GENTHERM INCORPORATED, Northville, MI (US)

(72) Inventors: Dusko Petrovski, Rochester, MI (US); Patrick Jordan, Austin, TX (US)

(73) Assignee: GENTHERM INCORPORATED, Northville, MI (US)

( * ) Notice: Subject to any disclaimer, the term of this patent is extended or adjusted under 35 U.S.C. 154(b) by 196 days.

(21) Appl. No.: 15/519,329

(22) PCT Filed: Oct. 15, 2015

(86) PCT No.: PCT/US2015/055653
§ 371 (c)(1),
(2) Date: Apr. 14, 2017

(87) PCT Pub. No.: WO2016/061305
PCT Pub. Date: Apr. 21, 2016

(65) Prior Publication Data
US 2017/0240079 A1    Aug. 24, 2017

Related U.S. Application Data

(60) Provisional application No. 62/065,556, filed on Oct. 17, 2014.

(51) Int. Cl.
*B60N 2/56*    (2006.01)
*B60N 2/90*    (2018.01)
(Continued)

(52) U.S. Cl.
CPC ............ *B60N 2/5642* (2013.01); *B60N 2/02* (2013.01); *B60N 2/0232* (2013.01);
(Continued)

(58) Field of Classification Search
CPC . F25B 21/02; F25B 21/00; A47C 7/72; B60L 1/02; B60N 2/56; B60N 2/02; B60N 2/44
See application file for complete search history.

(56) References Cited

U.S. PATENT DOCUMENTS

| | | |
|---|---|---|
| 2,235,520 A | 3/1941 | Nessell |
| 3,136,577 A | 6/1964 | Richard |
| (Continued) | | |

FOREIGN PATENT DOCUMENTS

| | | |
|---|---|---|
| DE | 195 03 291 | 8/1996 |
| DE | 199 12 764 | 9/2000 |
| (Continued) | | |

OTHER PUBLICATIONS

U.S. Appl. No. 15/536,407, filed Jun. 15, 2017, Androulakis et al.
(Continued)

*Primary Examiner* — McDieunel Marc
(74) *Attorney, Agent, or Firm* — Knobbe, Martens, Olson & Bear, LLP

(57) ABSTRACT

A distributed control system for a vehicle seat includes a control module for communicating on a single communication bus and a plurality of nodes connected to the control module via the communication bus, wherein each of the plurality of nodes are associated with a load device and each of the plurality of nodes comprises a logic component specific to the load device.

21 Claims, 12 Drawing Sheets

(51) Int. Cl.
*B60N 2/02* (2006.01)
*B60N 2/22* (2006.01)

(52) U.S. Cl.
CPC ............. *B60N 2/0248* (2013.01); *B60N 2/22* (2013.01); *B60N 2/5621* (2013.01); *B60N 2/5685* (2013.01); *B60N 2/976* (2018.02)

(56) References Cited

U.S. PATENT DOCUMENTS

| | | | |
|---|---|---|---|
| 3,137,523 A | 6/1964 | Karner | |
| 3,300,649 A | 1/1967 | Strawn | |
| 3,366,164 A | 1/1968 | Newton | |
| 3,529,310 A | 9/1970 | Olmo | |
| 3,894,213 A | 7/1975 | Agarwala | |
| 4,301,658 A | 11/1981 | Reed | |
| 4,572,430 A | 2/1986 | Takagi et al. | |
| 4,688,390 A | 8/1987 | Sawyer | |
| 5,097,674 A | 3/1992 | Imaiida et al. | |
| 5,497,632 A | 3/1996 | Robinson | |
| 5,524,439 A | 5/1996 | Gallup et al. | |
| 5,597,200 A * | 1/1997 | Gregory | A47C 7/74 297/180.13 |
| 5,623,828 A | 4/1997 | Harrington | |
| 5,626,021 A | 5/1997 | Karunasiri et al. | |
| 5,660,310 A | 8/1997 | LeGrow | |
| 5,772,500 A | 6/1998 | Harvey et al. | |
| 5,934,748 A | 8/1999 | Faust et al. | |
| 6,049,655 A | 4/2000 | Vazirani | |
| 6,062,641 A | 5/2000 | Suzuki et al. | |
| 6,079,485 A | 6/2000 | Esaki et al. | |
| 6,119,463 A | 9/2000 | Bell | |
| 6,120,370 A | 9/2000 | Asou et al. | |
| 6,164,719 A | 12/2000 | Rauh | |
| 6,223,539 B1 | 5/2001 | Bell | |
| 6,263,530 B1 | 7/2001 | Feher | |
| 6,291,803 B1 | 9/2001 | Fourrey | |
| RE38,128 E | 6/2003 | Gallup et al. | |
| 6,578,986 B2 | 6/2003 | Swaris et al. | |
| 6,619,736 B2 | 9/2003 | Stowe et al. | |
| 6,857,697 B2 | 2/2005 | Brennan et al. | |
| 6,876,549 B2 | 4/2005 | Beitmal et al. | |
| 7,114,771 B2 * | 10/2006 | Lofy | B60N 2/5628 297/180.13 |
| 7,475,938 B2 | 1/2009 | Stoewe et al. | |
| 7,587,901 B2 * | 9/2009 | Petrovski | A47C 7/74 62/3.3 |
| 7,827,805 B2 * | 11/2010 | Comiskey | B60N 2/5635 62/244 |
| 7,966,835 B2 | 6/2011 | Petrovski | |
| 8,143,554 B2 | 3/2012 | Lofy | |
| 8,516,842 B2 | 8/2013 | Petrovski | |
| 9,121,414 B2 | 9/2015 | Lofy et al. | |
| 10,005,337 B2 | 6/2018 | Petrovski | |
| 2001/0003806 A1 | 6/2001 | Swan et al. | |
| 2002/0017102 A1 | 2/2002 | Bell | |
| 2002/0121094 A1 | 9/2002 | VanHoudt | |
| 2004/0164594 A1 | 8/2004 | Stoewe et al. | |
| 2005/0265344 A1 | 12/2005 | Harris et al. | |
| 2006/0087160 A1* | 4/2006 | Dong | A47C 7/72 297/180.13 |
| 2008/0037316 A1 | 4/2008 | Inaba et al. | |
| 2009/0021955 A1 | 1/2009 | Kuang et al. | |
| 2009/0026813 A1 | 1/2009 | Lofy | |
| 2010/0001558 A1* | 1/2010 | Petrovski | A47C 7/74 297/180.12 |
| 2011/0282495 A1 | 11/2011 | Fischer et al. | |
| 2014/0090829 A1 | 4/2014 | Petrovski | |
| 2014/0163768 A1 | 6/2014 | Purdy et al. | |
| 2014/0305625 A1 | 10/2014 | Petrovski | |
| 2017/0361676 A1 | 12/2017 | Androulakis et al. | |
| 2018/0251008 A1 | 9/2018 | Androulakis et al. | |

FOREIGN PATENT DOCUMENTS

| | | |
|---|---|---|
| DE | 299 11 519 | 11/2000 |
| JP | 10-297243 | 11/1998 |
| JP | 2001-174028 | 6/2001 |
| JP | 2001/208405 | 8/2001 |
| WO | WO 95/014899 | 6/1995 |
| WO | WO 96/005475 | 2/1996 |
| WO | WO 2006/041935 | 4/2006 |
| WO | WO 2006/078394 | 7/2006 |
| WO | WO 2016/061305 | 4/2016 |

OTHER PUBLICATIONS

Photographs and accompanying description of climate control seat assembly system components publicly disclosed as early as Jan. 1998.
Photographs and accompanying description of a component of a climate control seat assembly system sold prior to Nov. 1, 2005.
Photographs and accompanying description of a component of a climate control seat assembly system sold prior to Dec. 20, 2003.
International Search Report and Written Opinion received in PCT Application No. PCT/US2015/055653, dated Dec. 30, 2015.
International Preliminary Report on Patentability received in PCT Application No. PCT/US2015/055653, dated Apr. 27, 2017.

* cited by examiner

CLIMATE CONTROL SYSTEMS AND METHODS

CROSS-REFERENCE TO RELATED APPLICATIONS

This application is the U.S. National Phase under 35 U.S.C. § 371 of International Application No. PCT/US2015/055653, filed Oct. 15, 2015, titled CLIMATE CONTROL SYSTEMS AND METHODS, which claims priority to U.S. Provisional Application No. 62/065,556, filed Oct. 17, 2014, titled CLIMATE CONTROL SYSTEM, the entirety of each of which is hereby incorporated herein by reference in its entirety and is to be considered a part of this specification.

BACKGROUND

Field

This disclosure relates to climate control, and, more particularly, to a climate control system.

Description of the Related Art

Temperature modified air for environmental control of living or working space is typically provided to relatively extensive areas, such as entire buildings, selected offices, or suites of rooms within a building. In the case of vehicles, such as automobiles, the entire vehicle is typically cooled or heated as a unit. There are many situations, however, in which more selective or restrictive air temperature modification is desirable. For example, it is often desirable to provide an individualized climate control for an occupant seat so that substantially instantaneous heating or cooling can be achieved. For example, an automotive vehicle exposed to the summer weather, where the vehicle has been parked in an unshaded area for a long period of time, can cause the vehicle seat to be very hot and uncomfortable for the occupant for some time after entering and using the vehicle, even with normal air conditioning. Furthermore, even with normal air-conditioning, on a hot day, the seat occupant's back and other pressure points may remain sweaty while seated. In the winter time, it is highly desirable to have the ability to quickly warm the seat of the occupant to facilitate the occupant's comfort, especially where the normal vehicle heater is unlikely to warm the vehicle's interior as quickly.

For such reasons, there have been various types of individualized climate control systems for vehicle seats, beds, chairs, and other structures. Such climate control systems can include a distribution system comprising a combination of channels and passages formed in the cushion of the seat, bed, chair or other structure. Climate conditioned air can be supplied to these channels and passages by a climate control device. The climate conditioned air can flow through the channels and passages to cool or heat the space adjacent the surface of the structure. In such systems, the climate control device (e.g., a fan or climate control module) can be secured beneath or behind a seat cushion.

SUMMARY

In one embodiment a distributed control system for a vehicle seat includes a control module for communicating on a single communication bus; a plurality of load devices connected to the control module via the communication bus; wherein each of the plurality of load devices comprises a logic component specific to the load device. In some embodiments, the load device includes one of a blower, a motor, a thermoelectric device, and an auxiliary heating component. In some embodiments, the control system includes no more than 16 nodes. In some embodiments, the logic component of each load device includes instructions specific to the connected load device. In some embodiments, one of the plurality of load devices is a master load device and the other load devices are slave devices to the master device. In some embodiments, at least one of the load devices includes a sensor and the logic component of the at least one load devices utilizes information from the sensor to control the load device.

In another embodiments, a method for controlling the operation of a thermally-conditioned seat, includes the steps of registering a user input on a mode of operation; sending a control signal comprising the mode of operation to a control module; distributing the control signal on a LIN bus to a plurality of LIN-controlled load devices; acknowledging the control signal at a desired LIN-controlled load device; and initiating operation of the load device in response to the user input. In some embodiments, the plurality of LIN-controlled load devices comprises a master load device and one or more slave devices, each of the plurality of LIN-controlled load devices comprising at least one sensor that reports diagnostic feedback to the master load device via a communication bus.

In yet another embodiment, a distributed control system for a vehicle seat, includes a control module for communicating on a single communication bus; a plurality of nodes connected to the control module via the communication bus; a plurality of load devices connected to the plurality of nodes; one or more sensors connected to one or more of the plurality of load devices, the one or more sensors providing feedback signals to one or more of the plurality of nodes; wherein each of the plurality of nodes comprises a logic component specific to the load device. In some embodiments, one of the plurality of nodes is a master node and the other nodes are slave nodes to the master node. In some embodiments, the logic component of each node includes instructions specific to the connected load device. In some embodiments, one or more of the load devices comprises a thermoelectric device. In some embodiments, the load device includes one of a motor, a blower, a fan, an actuator, or a heater.

In another embodiment, a method for controlling the operation of load devices associated with a vehicle seat includes the steps of registering a user input on a mode of operation; sending a control signal comprising the mode of operation to a control module; distributing the control signal on a bus to a plurality of load devices or plurality of nodes each connected to a load device; acknowledging the control signal at a desired controlled load device or node; and initiating operation of the load device in response to the user input.

Other features and advantages of the present invention will become more apparent from the following detailed description of the preferred embodiments in conjunction with the accompanying drawings, which illustrate, by way of example, the operation of the invention.

BRIEF DESCRIPTION OF THE DRAWINGS

The abovementioned and other features of the inventions disclosed herein are described below with reference to the drawings of the preferred embodiments. The illustrated embodiments are intended to illustrate, but not to limit the inventions. The drawings contain the following figures.

DETAILED DESCRIPTION OF THE PREFERRED EMBODIMENTS

In previous approaches for climate control system for seats, an electronic control module is separate from the load devices such as a thermoelectric device (TED) and/or blower. In addition to the cost of the electronic control module is the added cost of all the wires and connectors needed to connect the electronic control device to the load devices. In addition, often every connection to the electronic control module must be protected against a potential short to a battery or short to ground on any of the wires. In some previous configurations, the same electronic control module is used for the driver and passenger seats which results in as many as 14 wires going across the vehicle leading to a significant cost for wiring alone.

As will be described below, in some embodiments, a distributed control architecture places power and/or control functions in load devices (also referred to herein as "end devices") (e.g. vehicle actuators, blowers, thermal modules, heater mats), instead of all within a single controller, and in some embodiments employs an inter-device communication network in which one load device can control one or more load end devices. While the embodiments are described and shown in the context of an automobile seat, in certain embodiments, certain features can be used with seats for other vehicles and/or other types of support structures (e.g., beds, office chairs, etc.) and/or cooling/heating/venting applications (e.g., bins).

Figure 1:
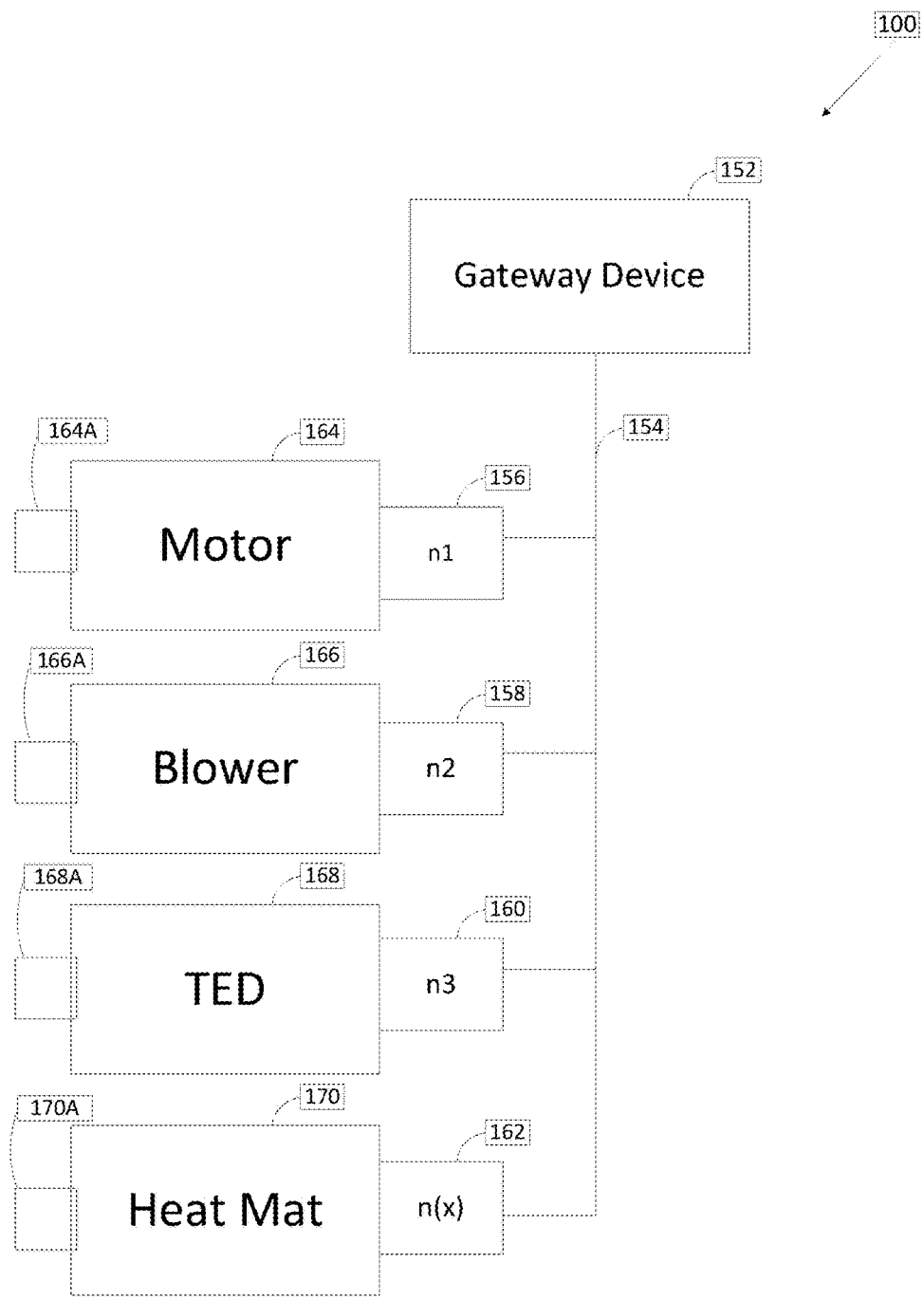
FIG. 1 is a schematic illustration of one embodiment of a distributed control architecture.

FIG. 1 is a schematic diagram that illustrates one embodiment of a distributed control architecture 100. The distributed control architecture 100 can include a gateway device 152, a bus 154, and a plurality of nodes 156, 158, 160, 162. The gateway device 152 is a input/output device that receives messages from a main controller, extracts relevant signals, and passes relevant signals on through on or more communication lines to local controllers or nodes. The gateway device 152 can also receive signals from local controllers or nodes. While nodes and four load devices are shown in FIG. 1, other configurations can include fewer nodes or load devices or 5, 6, 7, 8, 9, 10, or more nodes load devices in communication with the gateway device 102. In addition, one or more of the load devices can be combined in to single load device and/or arranged as described below in which one load device can control another load device. For example, in one arrangement, the blower 116 and the TED 118 can be combined to form a thermal module that can be configured to deliver heated and/or cooled air. Each of the nodes 156, 158, 160, 162 can be connected to a load device 164, 166, 168, 170. Each of the load devices 164, 166, 168, 170 can contain logic specific to the load device to which the node is connected. This logic can be implemented by a controller 164A, 166A, 168A, 170A of the respective load device 164, 166, 168, 170. The controllers 164A, 166A, 168A, 170A can include instructions specific to the load device, such as timing for operation of a blower or thermoelectric module, priority of operations, etc. The bus 104 can operate with any type of protocol, such as CAN, LIN, etc. while the gateway device 102 acts as the interface between the vehicle control system and the load devices. Each load device can also be connected to a power supply source and a ground, as discussed in further detail below.

In other embodiments, the nodes 156, 158, 160, 162 can contain logic specific to the load device to which the node is connected. In this configuration, the load devices 164, 166, 168, 170 can be "dumb" (that is, the load devices do not contain control logic) and may be independently controlled by the nodes 156, 158, 160, 162. In some embodiments, some of the nodes can include logic specific to the load devices while in other nodes the load device can contain the logic components. In other embodiments, the logic components can be shared between one or more nodes and their associated load devices.

Any of a variety of types of load devices can be connected via the nodes 156, 158, 160, 162 to the gateway device 152. As shown in FIG. 1, a motor 164, a blower 166, a thermoelectric device 168, and an auxiliary heating component such as a heat mat 170 are connected via nodes 156, 158, 160, 162 to the gateway device 152. In some configurations, the device 168 can include a thermoelectric unit and blower such as those described in U.S. Pat. Nos. 9,121,414 and 7,587,901 and U.S. Patent Publication Nos. 2009/0026813 and 2008/0087316, the entirety of each of these patents and publications being hereby incorporated by reference herein. Other embodiments the thermoelectric device can be replaced or supplemented with a heating element or other type of device conditions (e.g., transfers or removes heat) to fluid or air such as for example the heating elements described in U.S. Pat. Nos. 8,143,554 and 7,827,805, the entirety of each of these patents being hereby incorporated by reference herein. The load devices 164, 166, 168, 170 can contain logic to interpret instructions received from the gateway device 102 via the bus 154. The instructions can be sent from the gateway device 102 along the bus 104 and interpreted by the controllers 164A, 166A, 168A, 170A of the desired load device 164, 166, 168, 170, which can in turn determine whether the signal contains instructions relevant to the specific load device.

The bus can be configured to operate under any type of communication protocol, such as LIN or CAN. LIN, or Local Interconnect Network, is a serial network protocol used for communication between components in vehicles that is particularly useful due to the increase in the number of electronically controlled components in a vehicle.

Configurations such as those shown in FIG. 1 can not only eliminate numerous wires but also eliminate the protection circuitry for short conditions as well as eliminating the separate control module. In one embodiment, a LIN controller is duplicated for each load device (e.g., by providing the LIN controller in the controller of the load device) but this cost can be than offset by other savings, that is, savings due to reduced wiring and elimination of the separate control module. The illustrated arraignment can also provide a significant benefit in terms of packaging in the seat and can provides full flexibility for option content.

Figure 2:
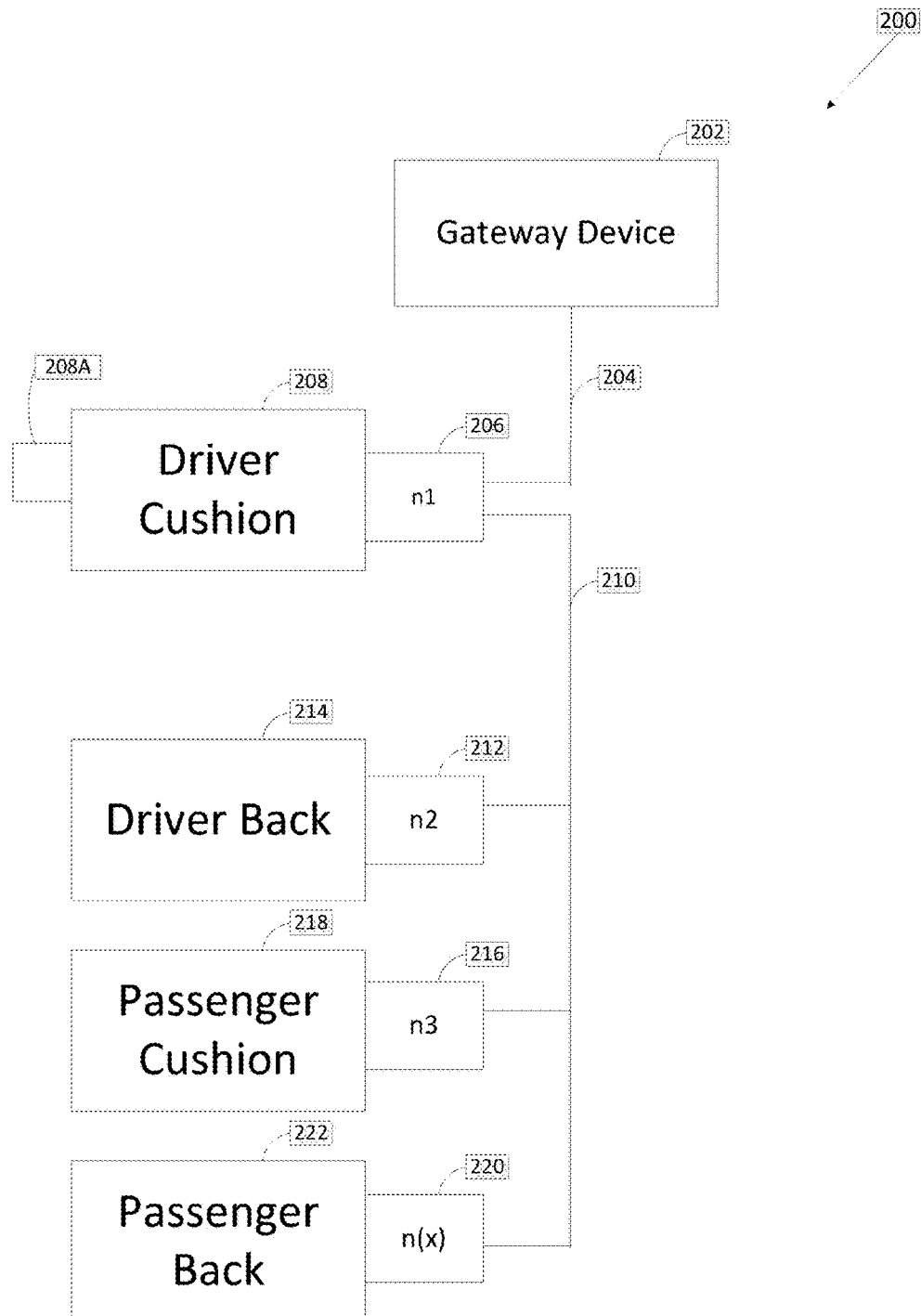
FIG. 2 is a schematic illustration of another embodiment of a distributed control architecture with a master device and a plurality of slave devices.

One limitation of the currently available LIN protocol is that it can define a maximum of 16 slave nodes on the bus. This limitation is a spec limitation, not a performance limitation. To exceed this limitation of nodes, each or a subset of the loads can be provided with a separate slave device (that is, if there are two loads 2 per seat) and the bus is shared with other functions. As shown in FIG. 2, in one arrangement, this can be overcome by making the first device a LIN slave to the vehicle and a LIN master to the other devices. As shown in FIG. 2, in one embodiment, the system 200 can include a gateway device 202 that is connected via a bus 204 to a first node 206. The first node 206 can be connected to a load 208 for a driver's seat cushion, such as a thermoelectric device. The load 208, via controller 208A, then acts as the master to send control signals via a second bus 210 to slave load devices 214, 218, 222 that are connected to the second bus 210 via the nodes 212, 216, 220. The load device 208 can act as a master to up to 16 slave nodes. In FIG. 2, the master load device 208 acts as a master to three separate slave devices 214, 218, 222 that are each connected to the bus 210 via the nodes 212, 216, 220. The slave devices can comprise any of a variety of load devices such as, for example, a thermoelectric device for a driver's seat back cushion, a thermoelectric device for a passenger seat cushion, and a thermoelectric device for a passenger seat back cushion. This adds one pin to the node 206 of the load device 208 as it now has 2 LIN channels. The LIN slave bus 210 in this configuration might also be a proprietary serial bus (UART) and which can realize some savings on the physical interface. While FIG. 2 illustrates a master load device and three slave load devices, any number of slave load devices up to the specification limitation of 16 may be used. Furthermore, while FIG. 2 illustrates thermoelectric devices as the load devices, the illustrated distributed control architecture with master/slave configuration may be used with other load devices that control features such as massage, lumbar, motors, power mirrors, memory seat controls, or other vehicle features.

Some manufacturers do not have a LIN bus available in the seat but have a CAN bus. In this case the master/slave concept discussed above with respect to FIG. 2 can be a CAN to LIN (or CAN to UART) gateway.

Figure 3:
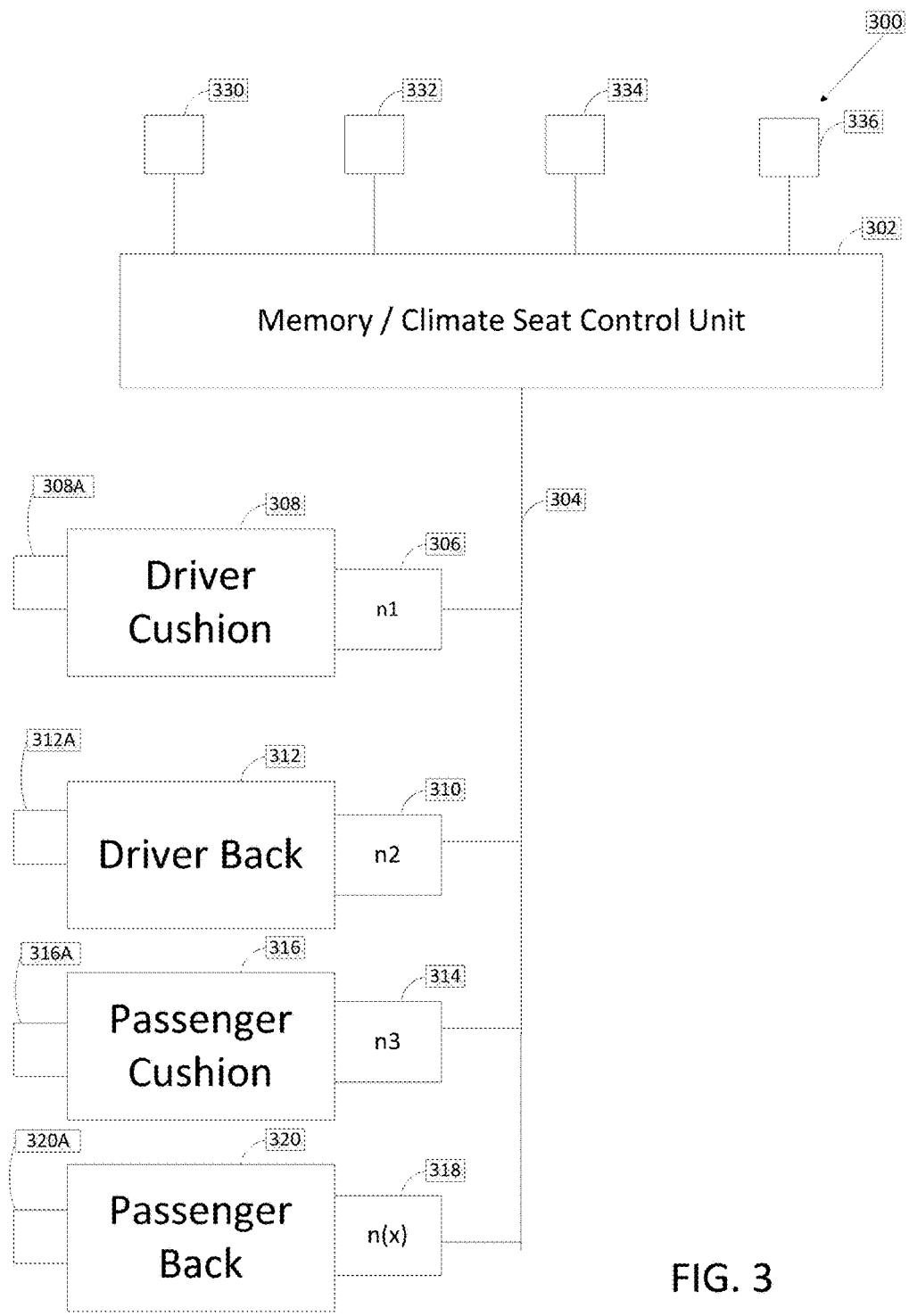
FIG. 3 is a schematic illustration of another embodiment of a distributed control architecture as part of a vehicle seat control architecture.

With reference to FIG. 3, another configuration 300 is illustrated in which a memory seat control module 302 is used as the LIN master or gateway device. The memory/climate seat control module 302 is the LIN master device and is connected via bus 304 to a plurality of nodes 306, 310, 314, 318, which are associated with load devices 308, 312, 316, 320 respectively. Each of the load devices 308, 312, 316, 320 can contain logic specific to the load device to which the node is connected. This logic can be embedded in a controller 308A, 312A, 316A, 320A of the respective load device 308, 312, 316, 320 and include instructions specific to the load device. The memory/climate seat control module 302 is further connected to motors and sensors 330, 332, 334, 336 used for memory seat functions. In some configurations, a CAN bus may be connected to the memory seat control module 302. In some configurations, a UART connection to powered mirrors and/or steering wheel controls may also be controlled by the memory seat control module 302. In some configurations, the motors and adjustment switches for the memory seat are connected directly to the memory seat module 300. However, in some configurations, the memory switches are in the door and are communicated over CAN. In other configurations, the mirrors have their own control unit that communicates with the memory seat module 300 over a UART connection.

Another seat feature that is becoming popular on high end vehicles is lumbar and massage using pneumatic bladders in the seat. In addition to the bladders this requires a pump and pneumatic valves to control the air flow.

Figure 4:
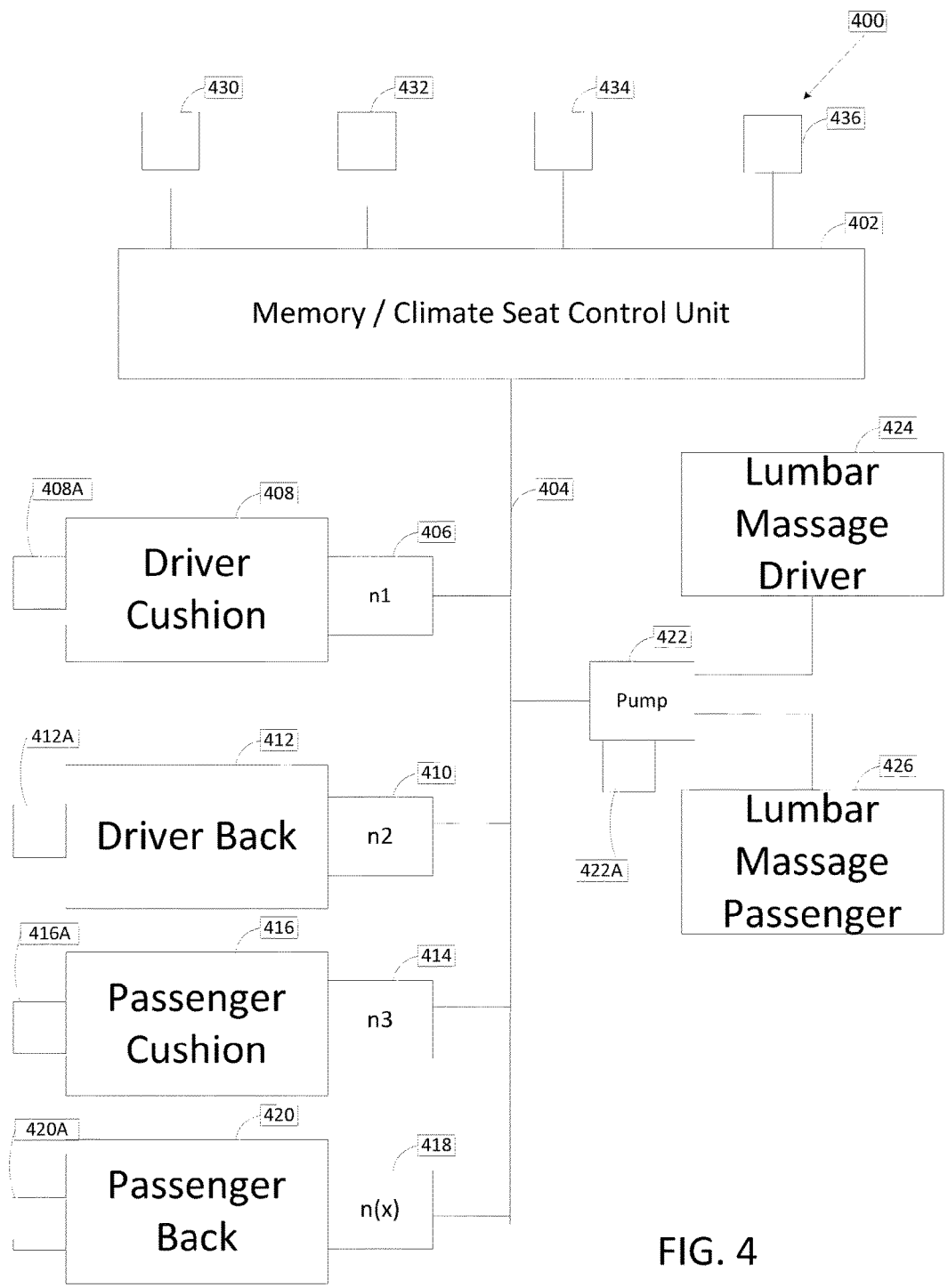
FIG. 4 is a schematic illustration of another embodiment of a distributed control architecture including heating/cooling functions and massage functions for a vehicle seat.

Adding to the concepts illustrated in FIGS. 1-3, one configuration of a complete seat system 400 that includes lumbar and massage is illustrated schematically in FIG. 4. In this configuration, a memory seat module 402 is the master and all the other functions (such as climate control, lumbar, and massage) are LIN slaves. The memory/climate seat control module 402 is the LIN master device and is connected via bus 404 to a plurality of nodes 406, 410, 414, 418, which are associated with load devices 408, 412, 416, 420 respectively. Each of the load devices 408, 412, 416, 420 can contain logic specific to the load device to which the node is connected. This logic can be embedded in a controller 408A, 412A, 416A, 420A of the respective load device 408, 412, 416, 420 and include instructions specific to the load device. The memory/climate seat control module 402 is further connected to motors and sensors 430, 432, 434, 436 used for memory seat functions. Additionally, a pump 422 is connected to the memory seat control module 402 via the bus 404 as an additional LIN slave device. The pump 422 contains or is connected to a controller 422A that contains logic specific to the pump 422. The pump 422 is in turn connected to lumbar massage assemblies 424 that can include pneumatic bladders and valves installed within the seat to provide air flow. In some configurations, a CAN bus may be connected to the memory seat control module 402. In some configurations, a UART connection to powered mirrors and/or steering wheel controls may also be controlled by the memory seat control module 402. This embodiment can result in a significant reduction in wiring compared to current designs and provides the ultimate in flexibility of option content for the manufacturer. The memory seat module 402 is shown as the master here because this module is generally always present in the high end seats (lowest common denominator). However, in other configurations, another component may be the master device.

In some configurations, adjustment switches and memory switches are connected directly to the memory seat module. Mirrors and steering column adjustment may be connected to a separate module. In some configurations, a proprietary UART connection is used to communicate between the seat and mirrors/steering column.

Figure 5:
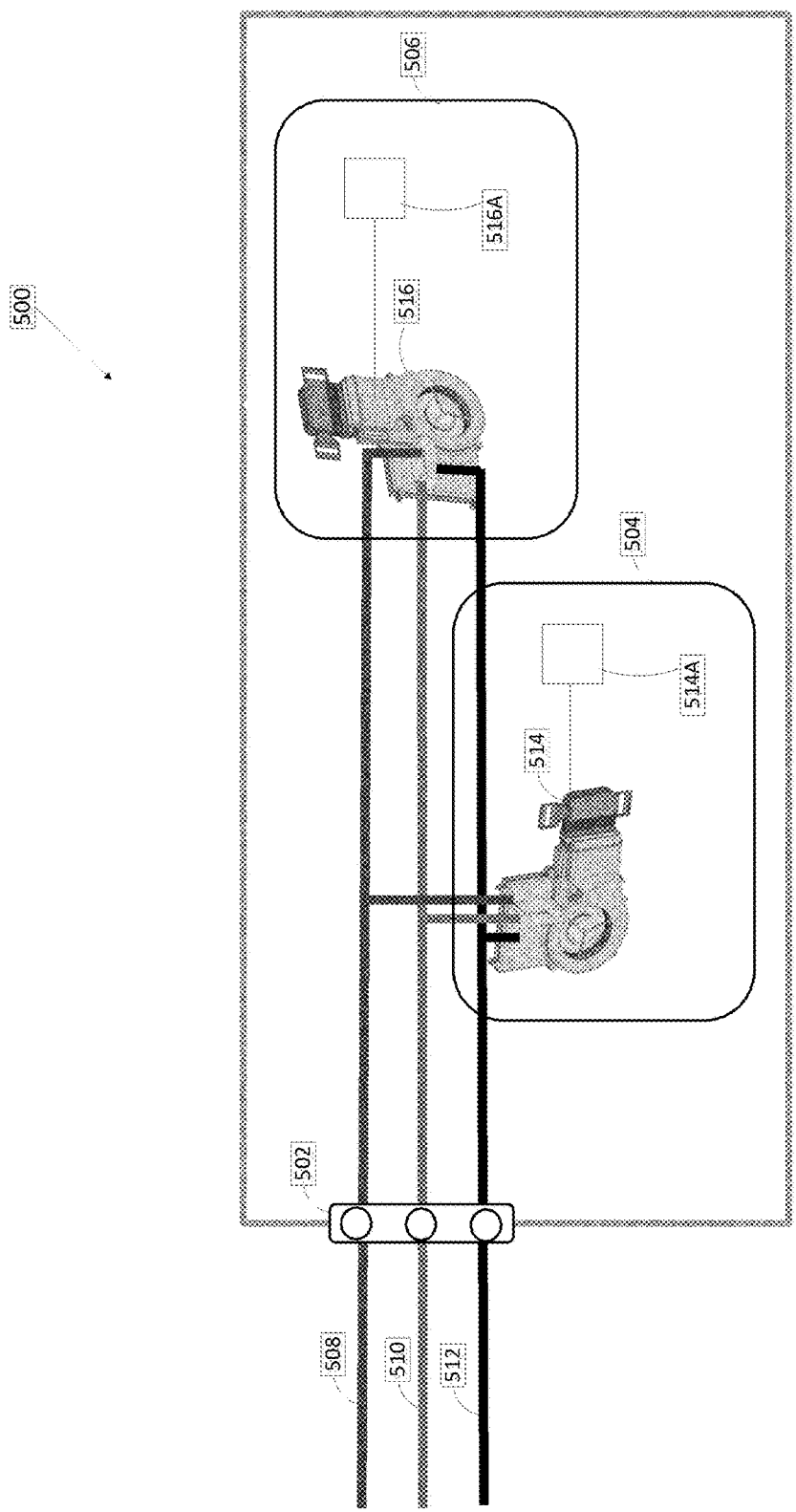
FIG. 5 is a schematic illustration of another embodiment of a distributed control architecture for a climate control load devices for a vehicle seat.

Another configuration of a LIN-based distributed control architecture for a climate controlled seat is shown schematically in FIG. 5. In this control architecture 500, a 3-wire LIN interface from the vehicle passes through the connector 502 to control load devices associated with portions of a vehicle seat, such as a vehicle seat cushion 504 and a vehicle seat back 506. The 3-wire LIN interface includes a power supply connection 508, a LIN connection 510, and a ground connection 512. Each of the connections passes to each load device 514, 516. Each of the load devices 514, 516 can contain logic specific to the load device to which the node is connected. This logic can be embedded in a controller 514A, 516A of the respective load device 514, 516 and include instructions specific to the load device. A LIN-based control signal originates from a master controller or gateway device in the vehicle that is not shown in FIG. 5. In some configurations, each of the vehicle seat components 504, 506 can include a load device 514, 516, such as a thermal module. In some configurations, each thermal module can include a thermoelectric device, a blower, sensors, etc. that may be used to provide heated and/or cooled air to the vehicle seat such as described in U.S. Pat. Nos. 9,121,414 and 7,587,901 and U.S. Patent Publication Nos. 2009/0026813 and 2008/0087316, which were incorporated above by reference herein.

Figure 6:
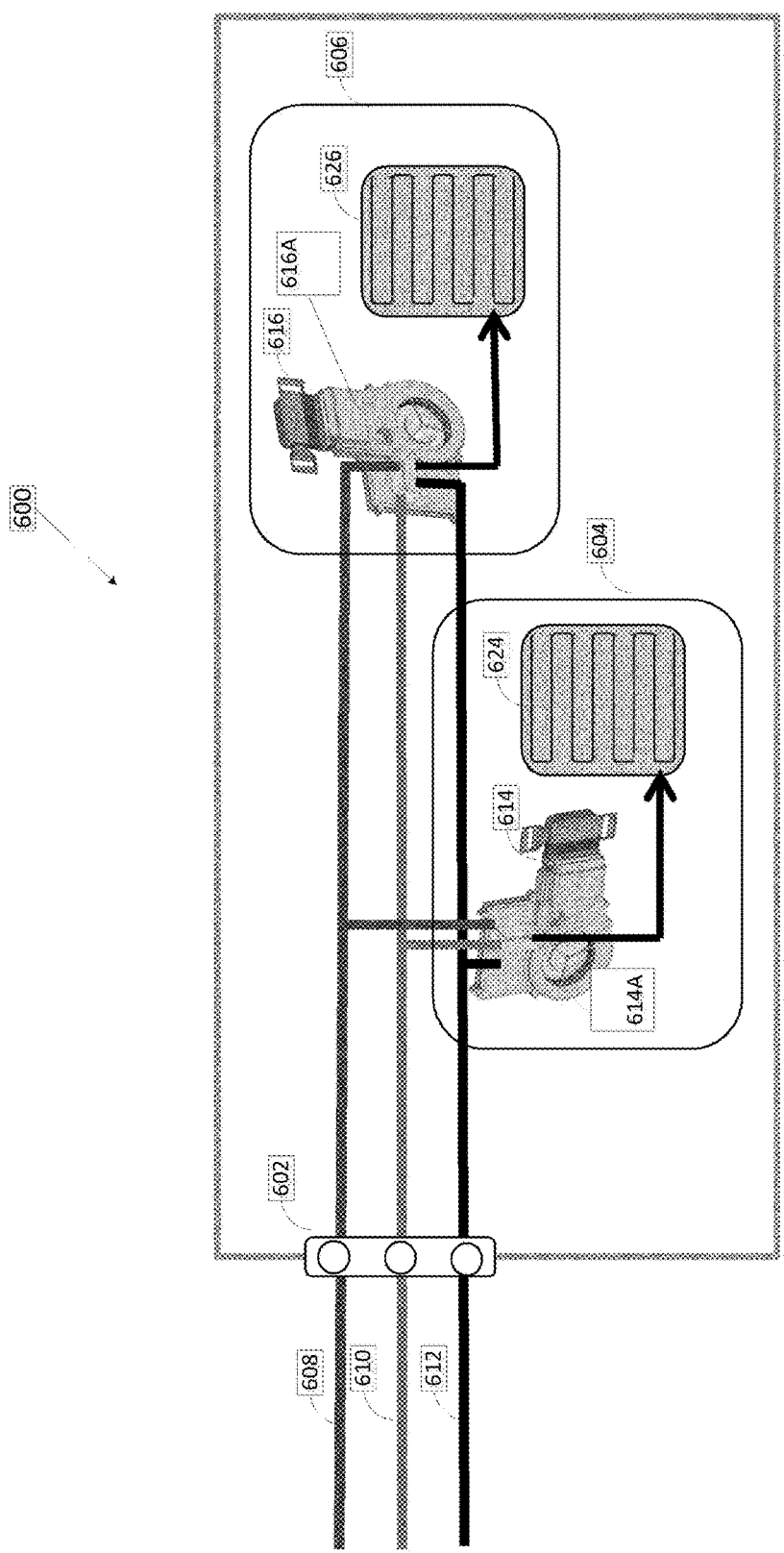
FIG. 6 is a schematic illustration of another embodiment of a distributed control architecture for a climate control load devices for a vehicle seat including an auxiliary heater.

In some configurations, the architecture illustrated in FIG. 5 can be scalable to include an auxiliary heating component such as a heat mat. Similar to the configuration shown in FIG. 6, the architecture 600 includes a 3-wire LIN interface that passes from the vehicle through the connector 602 to control load devices associated with portions of a vehicle seat, such as a vehicle seat cushion 604 and a vehicle seat back 606. The 3-wire LIN interface includes a power supply connection 608, a LIN connection 610, and a ground connection 612. Each of the connections passes to each load device 614, 616. Each of the load devices 614, 616 can contain logic specific to the load device to which the node is connected. This logic can be embedded in a controller 614A, 616A of the respective load device 614, 616 and include instructions specific to the load device. A LIN-based control signal originates from a master controller or gateway device in the vehicle that is not shown in FIG. 6. In some configurations, each of the vehicle seat portions 604, 606 can include a load device 614, 616, such as a thermal module. In some configurations, each thermal module can include a thermoelectric device, a blower, sensors, etc. that may be used to provide heated and/or cooled air to the vehicle seat. As shown in FIG. 6, an auxiliary heating component 624, 626 may be connected to the thermal module 614, 616 and receive power from the power connection 612 connected to the thermal module 614, 616. Logic within the thermal module 614, 616 can determine when to provide power to the auxiliary heating component 624, 626, for example, at times when immediate heat is desired. In some embodiments, the heating component 624, 626 is a resistance type heater or "heat mat" which can be placed near or adjacent the top or upper surfaces of a seat.

Figure 7:
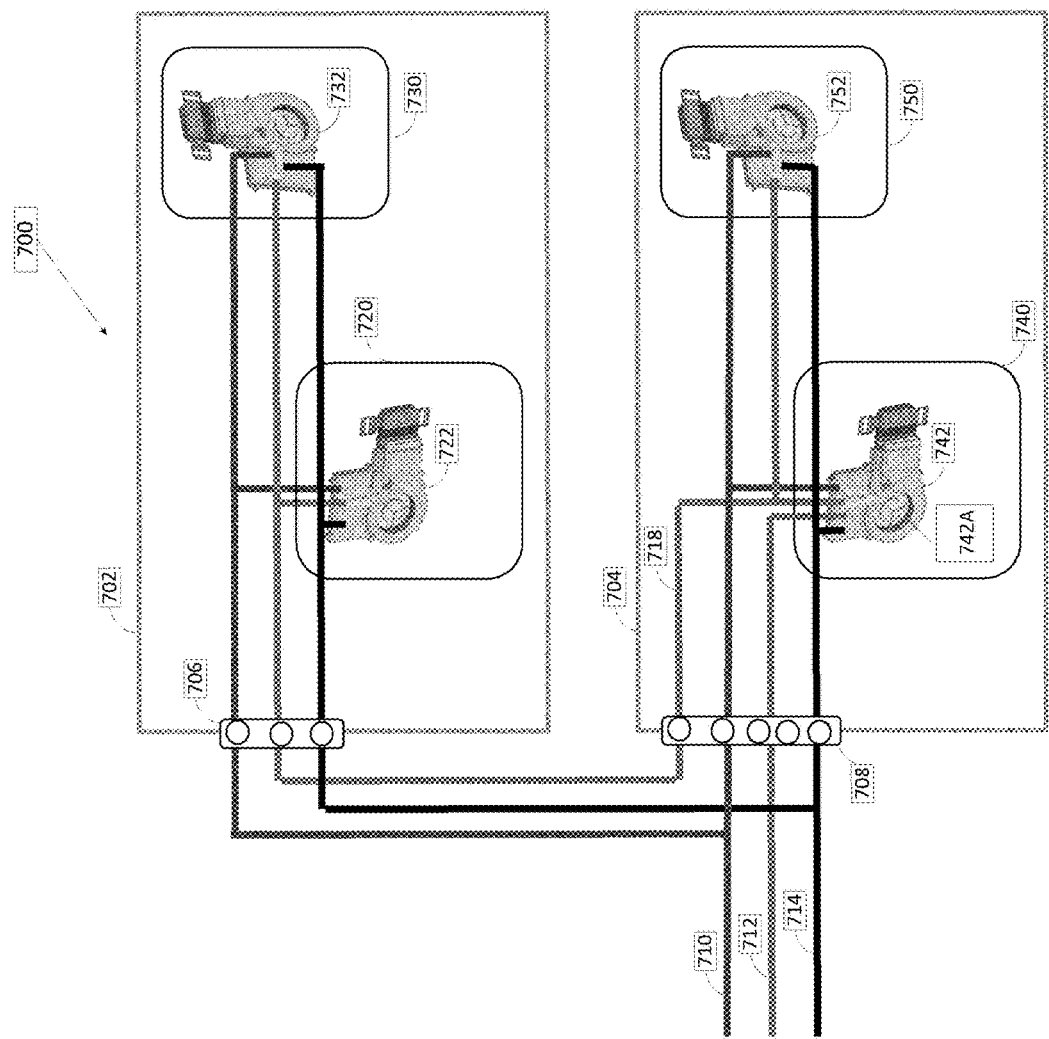
FIG. 7 is a schematic illustration of another embodiment of a distributed control architecture for climate control load devices for both a driver and a passenger seat.

Other configurations of a LIN-based distributed control architecture can be scalable to provide power and control to a plurality of vehicle seats, such as a driver seat cushion and back and a passenger seat cushion and back. However, as discussed above, one limitation of the LIN protocol is that a specification limitation defines a maximum number of slave nodes on the bus, typically restricting the number of slave nodes to no more than 16. In some cases, a manufacture may exceed this number of slave nodes if each load device is a separate slave device and the bus is shared with other functions. FIG. 7 illustrates a distributed control architecture 700 in which one load device 742 is a master device and the other load devices 722, 732, 752 are slaves to the master device. Similar to the configurations shown in FIGS. 5 and 6, the architecture 700 includes a 3-wire LIN interface that passes from the vehicle through the connector 708 to control load devices associated with portions of a driver's seat 704 and a passenger seat 702, such as a driver's seat cushion 740 and seat back 750 and a passenger seat cushion 720 and seat back 730. The 3-wire LIN interface includes a power supply connection 710, a LIN connection 712, and a ground connection 714. Each of the power and ground connections 710, 714 pass through the connectors 706, 708 to the load devices 722, 732, 742, 752. A LIN-based control signal originates from a master controller or gateway device in the vehicle that is not shown in FIG. 7 and passes through the connector 708 to the controller 724A of the master load device 742. From the master load device 742, the LIN-based control signal passes through the bus to the slave load devices 722, 732, 752. In some configurations, each of the load devices 722, 732, 742, 752 can be a thermal module. In some configurations, each thermal module can include a thermoelectric device, a blower, sensors, etc. that may be used to provide heated and/or cooled air to the vehicle seat. In other configurations, the load devices may be other devices such as motors, blowers, pumps, etc.

Figure 8:
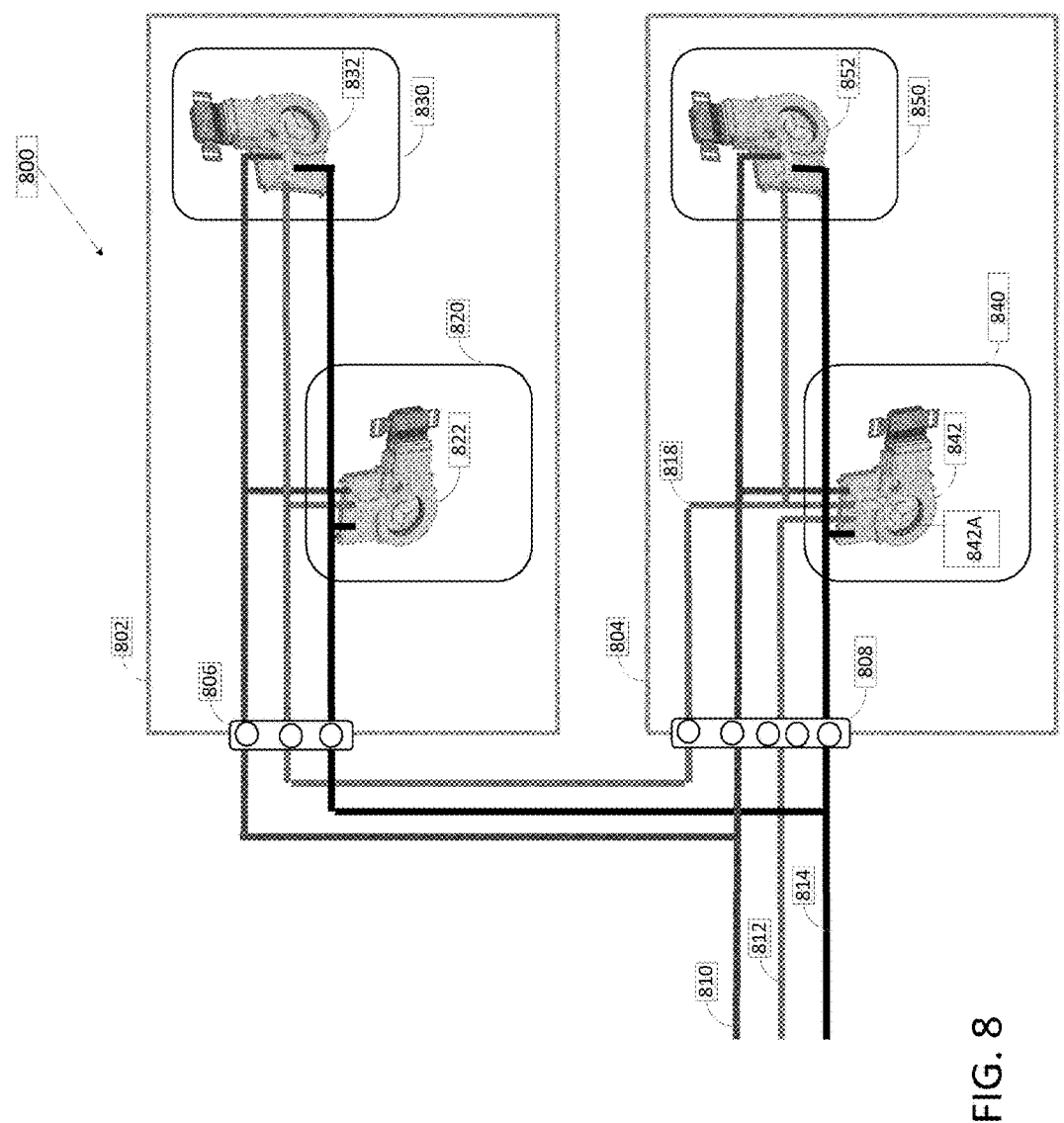
FIG. 8 is a schematic illustration of another embodiment of a distributed control architecture for climate control load devices for both a driver and a passenger seat.

In other configurations, a LIN bus may not be available in the vehicle seat, In these configurations, as illustrated in FIG. 8, a CAN connection 812 can be provided to the master device 842 of the seat portion 840 and a LIN connection 818 can be used to communicate with the slave devices 822, 832, 852. Similar to the configuration shown in FIG. 7, the architecture 800 includes a 3-wire interface including a CAN component 812 that passes from the vehicle through the connector 808 to control load devices associated with portions of a driver's seat 804 and a passenger seat 802, such as a driver's seat cushion 840 and seat back 850 and a passenger seat cushion 820 and seat back 830. The 3-wire interface includes a power supply connection 810, a CAN connection 812, and a ground connection 814. Each of the power and ground connections 810, 814 pass through the connectors 806, 808 to the load devices 822, 832, 842, 852. A CAN-based control signal originates from a master controller or gateway device in the vehicle that is not shown in FIG. 8 and passes through the connector 808 to the controller 842A of the master load device 842. From the master load device 842, a LIN-based control signal passes through the bus to the slave load devices 822, 832, 852. In some configurations, each of the load devices 822, 832, 842, 852 can be a thermal module. In some configurations, each thermal module can include a thermoelectric device, a blower, sensors, etc. that may be used to provide heated and/or cooled fluid to the vehicle seat. In other configurations, the load devices may be other devices such as motors, blowers, pumps, etc.

Figure 9:
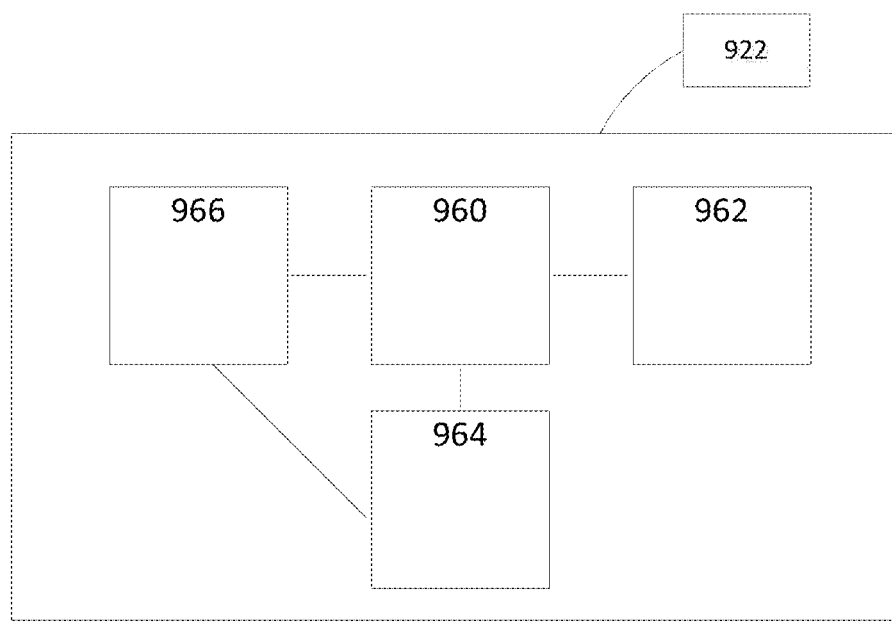
FIG. 9 is a schematic illustration of a load device according to one embodiment.
Figure 12:
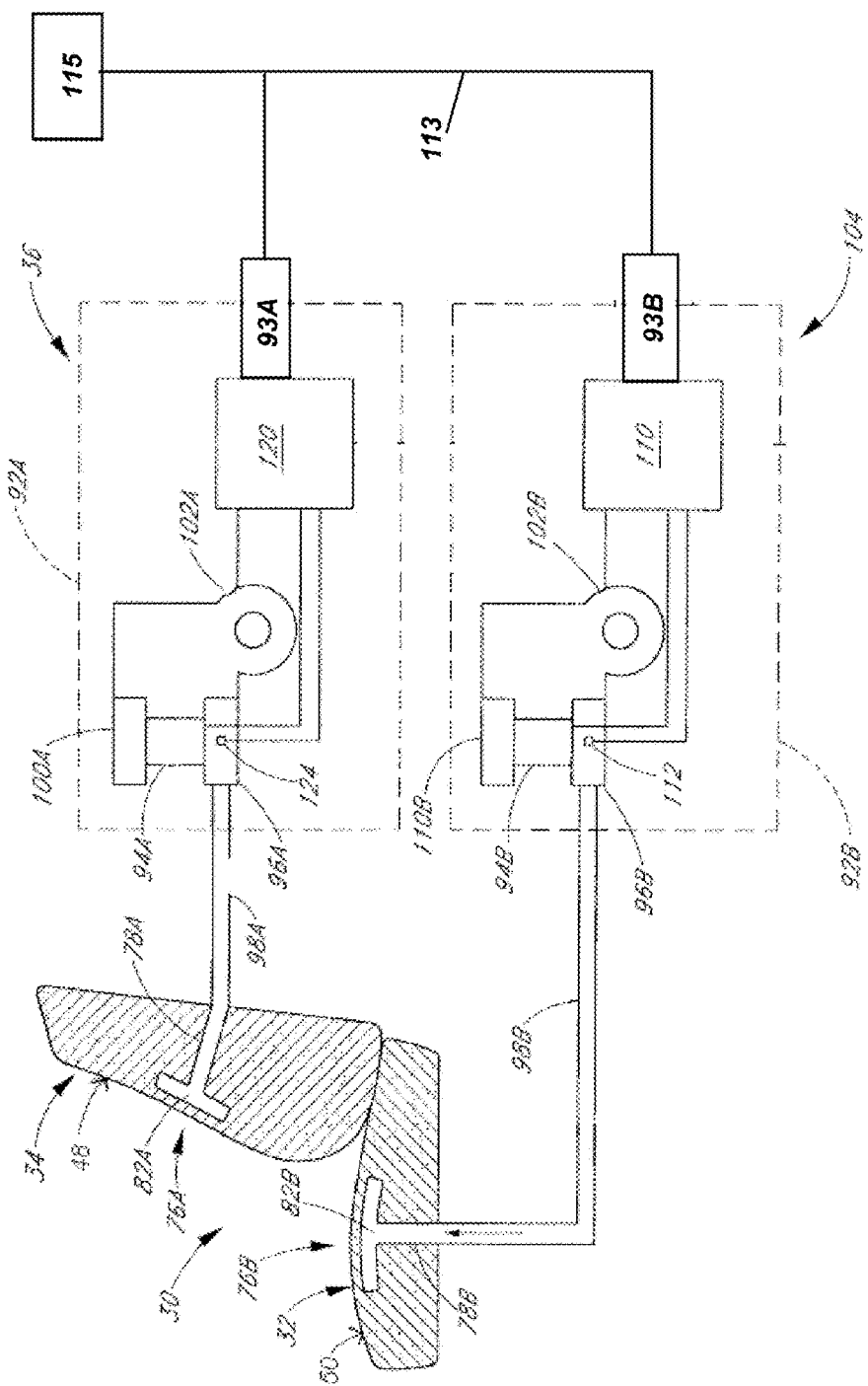
FIG. 12 is a schematic illustration of components of a vehicle seat climate control system that can be used with embodiments of a distributed control architecture disclosed herein.

As discussed above, a load device may be climate control component for a vehicle seat, such as a thermal module. As illustrated in FIG. 9, the load device 922 can be a thermal module for providing heated and/or cooled fluid to a vehicle seat. The vehicle seat, in turn, can include one or more passages for delivering heated or cooled fluid (e.g., air) to surfaces of the vehicle seat that support an occupant. For example, FIG. 12 is a schematic illustration of the climate control system 36 that can be incorporated into a vehicle seat. In the illustrated embodiment, the climate control system can include a back thermal module 92A and seat thermal module 92B. As will be explained below, both thermal modules 92A, 92B can be configured to provide conditioned fluid (and/or to remove fluid in some embodiments) to the distribution systems 76A, 76B that may, in some embodiments, comprise passages within the seat to deliver conditioned fluid to the seat. In this manner, the thermal modules 92A, 92B provide a fluid flow to either warm or cool the front surface 48 of the backrest 34 and the top surface 50 of the seat portion 32 respectively. Specifically, the climate control apparatus 36 preferably provides conditioned air that is either heated or cooled relative to the temperature of the front surface 48 of the back rest 32 and the top surface 50 of the seat 32.

In the illustrated embodiment, the thermal modules 92A, 92B preferably each include a thermoelectric device 94A, 94B for temperature conditioning (i.e. selectively heating or cooling) the fluid flowing through the device 94A, 94B. A preferred thermoelectric device 94A, 94B is a Peltier thermoelectric module. The illustrated thermal modules 92A, 92B preferably also include a main heat exchanger 96A, 96B for transferring or removing thermal energy from the fluid flowing through the modules 92A, 92B and to the distribution systems 76A, 76B. Such fluid is transferred to the distribution systems 76A, 76B through conduits 98A, 98B (see e.g., U.S. Publication No. 2006/0087160, filed Oct. 25, 2004, which is hereby incorporated by reference herein). The modules 92A, 92B also preferably include a waste heat exchanger 100A, 100B that extends from the thermoelectric device 94A, 94B generally opposite the main heat exchanger 96A, 96B. A pumping device 102A, 102B is preferably associated with each thermal module 92A, 92B for directing fluid over the main and/or waste heat exchangers 96A, 96B, 100A, 100B. The pumping devices 102A, 102B may comprise an electrical fan or blower, such as, for example, an axial blower and/or radial fan. In the illustrated embodiment, a single pumping device 102A, 102B may be used for both the main and waste heat exchangers 96A, 96B, 100A, 100B. However, it is anticipated that separate pumping devices may be associated with the waste and heat exchanges 96A, 96B, 100A, 100B.

It should be appreciated that the thermal modules 92A, 92B described above represents only one exemplary embodiment of a device that may be used to condition the air supplied to the distribution systems 76A, 76B. Any of a variety of differently configured thermal modules may be used to provide conditioned air. Other examples of thermal modules that may be used are described in U.S. Pat. Nos. 6,223,539, 6,119,463, 5,524,439 or 5,626,021, which are hereby incorporated by reference in their entirety. In another example, the thermal module may comprise a pump device without a thermoelectric device for thermally conditioning the air. In such an embodiment, the pumping device may be used to remove or supply air to the distribution system 76A, 76B. In yet another embodiment, the thermal modules 92A, 92B, may share one or more components (e.g., pumping devices, thermoelectric devices, etc.) with the vehicles general climate control system.

In operation, fluid in the form of air can be delivered from the thermal modules 92A, 92B, through the conduits 98A, 98B to the distribution systems 76A, 76B. As described above, the air flows through the passages 82A, 82B, into the openings 84A, 84B and then along the distribution layer 86A, 86B and through the covering 74. In this manner, conditioned air can be provided to the front surface 48 of the backrest 34 and the top surface 50 of the seat 32.

In the illustrated arrangement, the thermal modules 92A, 92B can be part of a distributed control architecture system in accordance with the embodiments described herein. Accordingly, the thermal modules can be connected to nodes 93A, 93B which in turn can be connected via a bus 113 to a gateway device 115. Thus in this embodiment, the thermal modules 92A, 92B comprise the load devices. As noted above, in modified embodiments there can be more or fewer nodes and/or load devices. As will be described below, in the illustrated embodiment, the thermal modules 92A, 92B include controllers that contain logic specific to the thermal modules and/or for controlling other load devices. However, in modified embodiment, the logic (wholly or partially) can be provided within the nodes. Through a user input device (not shown) the user of the climate control system 36 can provide a control setting or set mode for the climate control system 36. The control setting can comprise a specific temperature setting (e.g., 65 degrees), a more general temperature setting (e.g., "hot" or "cold"), and/or a setting for the pumping device (e.g., "high," "medium," or "low"). Depending upon the desired configuration, the input device may include any of a variety of input devices, such as, for example, dials, buttons, levers, switches, etc. The user input device may also include a user output that provides visual or audio indicia of the control setting (e.g., an LED display). These inputs can be transmitted through the gateway device 115 and the bus 113 to respective the control modules of the thermal modules 92A, 92B.

With continued reference to FIG. 12, a seat control module 110 is associated with the seat thermal module 92B. The seat control module 110 is, in turn, operatively connected to the pumping device 102B and the thermoelectric device 94B. The control module 110 can be physical incorporated into the thermal module 92B or can form a separate physical component. In addition, a temperature sensor 112 can be provided to measure the temperature of the fluid conditioned by the thermoelectric device 94B. In other embodiments, one or more additional sensors (e.g., a liquid or humidity sensor) can be provided and connected to the control module 110. The temperature sensor 112 is operatively connected to the seat control module 110. The seat control module 110 is preferably also operatively connected to a power source (not shown) and a ground source (not shown) and includes an appropriate power control unit to provide sufficient electrical capacity to operate all of the aforementioned devices (92B, 94B, 112) of the seat thermal module 92B. The seat control module 110 preferably also has a controller that is configured to receive the occupant inputs from the input device and the temperature information from the temperature sensor 112. From this information, the seat control module 110 is configured to make adjustments to the operation of the thermoelectric device 94B and the fluid pump 102B according to a predetermined logic designed to ensure occupant comfort and to protect against system damage. Those of skill in the art will appreciate that the seat control module can comprise a hard-wired feedback control circuit, a dedicated processor or any other control device that can be constructed for performing the steps and functions described herein. In additions, the controller within the seat control module 110 may be combined or divided as deemed appropriate.

Various components are described as being "operatively connected" to the control unit. It should be appreciated that this is a broad term that includes physical connections (e.g., electrical wires) and non-physical connections (e.g., radio or infrared signals). It should also be appreciated that "operatively connected" includes direct connections and indirect connections (e.g., through an additional intermediate device).

The seat control module 110 optionally may also be configured to receive a signal from a vehicle control device that indicates whether the vehicle's ignition has been turned on. In this manner, the seat control module 110 may be configured to allow operation of the thermal module 92B only if the vehicle's engine is running.

With continued reference to FIG. 12, the backrest thermal module 92A includes a backrest control module 120. As shown, the backrest control module 120 is operatively connected to the thermoelectric device 94A and the fluid pump 102A for the backrest 34. The backrest control module 120 is connected to the power source (not shown) and the ground source (not shown) and includes a controller configured to provide sufficient electrical capacity to operate the thermoelectric device 94A and the fluid pump 102A. In certain embodiments, the backrest control module 120 can optionally be configured to receive a control signal from the seat control module 110. However, as shown in the illustrated embodiment, the backrest control module 120 can be connected via a node 93A to receive signals through the bus 113. From this information, the backrest control module 120 operates the thermoelectric device 94B and the fluid pump 102B to ensure occupant comfort and safety, and protect against system damage. Those of skill in the art will appreciate that the backrest control module 120 can comprise a hard wired feedback control circuit, a dedicated processor or any other control device that can be constructed for performing the steps and functions described herein.

As noted above, in certain embodiments, the backrest control module 120 can optionally be configured to receive a control signal from the seat control module 110. In such an arrangement, the backrest control module 120 need not be connected to the node or bus which can allow another load device to be connected to the bus 113. Accordingly, in one arrangement, the seat control module 110 can act as the master to send control signals via the communication line 122 to the backrest control module 110

The illustrated embodiment optionally includes a backrest temperature sensor 124 for measuring the temperature of the fluid that has been thermally conditioned by the backrest thermal module 92A. The information from this temperature sensor 124 may optionally be transmitted through a communication line to the seat control unit 110 such that the seat control unit 110 can control the backrest thermal module 92A. In such a configuration, the seat control unit 110 may be configured to use this temperature signal to generate the control signals transmitted to the backrest control unit 120. In the illustrated embodiment, the control unit 120 for the backrest 34 is operatively connected directly to the node 93A and bus 113 in a manner similar to that described above for the control unit 110 for the seat 32 such that the back rest control unit 120 can control the back rest thermal module 92A

In the above description, the control units 110, 120 are described as being associated with the "back" or "seat" cushion. In modified embodiments, it should be appreciated that the features of the back and seat controllers may be reversed. That is, the backrest control module 120 may be configured to interpret the signals from the user input device (not shown) and to control the seat control module. In still other embodiments, the features of the back and seat controllers may be applied to different zones of a seat, such as, for example, a top and bottom portion of a backrest. In other embodiments, the features of the back and seat controllers may be applied to different zones of an occupant area that are to be thermally conditioned, such as, for example, back and rear seat assemblies or left and right seat assemblies. The above-configuration can also be used in other types of support devices such a bed, a bed topper, a wheel chair, sofa, office chair etc.

In a preferred embodiment, the backrest control unit 120 and/or the seat control unit 110 are generally coupled to the other components of their respective thermal modules 92A, 92B and, more preferably, disposed substantially within the same housing or protective casing 130 which contains the thermoelectric device 94A, 94B and fluid pumps 102A, 102B.

While the embodiment shown in FIG. 12 includes separate control units 110, 120, any of the LIN-based distributed control architectures discussed above with respect to FIGS. 1-11 may be used to provide power, signal, and ground connections to the load devices 92A, 92B of the vehicle seat or to nodes connected to the load devices. As discussed above, logic to control the load devices may be found within the load devices or within the nodes. Similarly, one or more load devices or nodes may be slave components to a master load device or node, as discussed above.

With continued reference to FIG. 9, the device 922 can include a thermoelectric device 964 to convert electrical energy into thermal energy producing a temperature change in response to an electrical current being applied thereto. A fluid transfer device 966 produces a fluid flow that is in thermal communication with the thermoelectric device 964 so that the thermal energy generated by the thermoelectric device is transferred to the fluid flow.

A load device 922 is contained within a housing that has an outlet and an inlet through which the fluid flow is directed. The thermoelectric device 964 and the fluid transfer device 966 are positioned at least partially within the housing. An environmental sensor 962 is configured to provide indication of an environmental condition that may be used as feedback for operation of the load device, such as condensation, humidity, ambient temperature, fluid temperature, pressure, etc.

The thermoelectric device can be a Peltier thermoelectric module, which includes a Peltier circuit. A Peltier circuit is a type of thermoelectric device that comprises two sides, each of which is either heated or cooled when current is delivered through the circuit. For example, when voltage is applied in a first direction through the thermoelectric device, one side generally generates heat while the opposite side absorbs heat (i.e., is "cooled"). The thermoelectric device can be configured so that switching the polarity of the circuit can create the opposite effect. Typically, thermoelectric devices comprise a closed circuit that includes dissimilar materials. As a DC voltage is applied across the closed circuit, a temperature change is generated at the junction of the dissimilar materials. Thus, depending on the direction that electrical current flows through the thermoelectric device, heat is either emitted or absorbed. Thermoelectric devices can include several such junctions connected electrically in series. The junctions can be sandwiched between two ceramic plates that generally form the cold side and the hot side of the device. The cold side and hot side can be thermally coupled to one or more heat transfer devices (e.g., fins) that facilitate heat transfer with a volume of air or other fluid. Thus, air or other fluid from the fluid transfer device 966 can be passed through or near the cold and/or hot side of a thermoelectric device (e.g., Peltier circuit) to selectively heat and/or cool the air or other fluid.

A control unit 960 is coupled to the housing and is operatively connected to the sensor 962. The environmental sensor 962 provides feedback on an environmental condition that can be used by the control unit 960 to control functional aspects of the load device, such as a temperature of a fluid flow, a pumping rate of a pump, a speed of a blower and/or motor, etc. The control unit 960 may be further configured to receive a signal that is indicative of a desired temperature or pressure of the fluid flow and is configured to control the thermoelectric device 964 and the fluid transfer device 966. While the load device 922 is illustrated as climate control load device for a vehicle seat, the load device 922 may be any other type of load device, such as a pump for providing lumbar and massage to a vehicle seat, a motor to drive a vehicle seat position, or any other type of load device. Additionally, while one sensor 962 is illustrated, in some configurations a 2, 3, 4, or more sensors may be connected to the control unit 960 to provide feedback used in operation of the load device 922.

Figure 10:
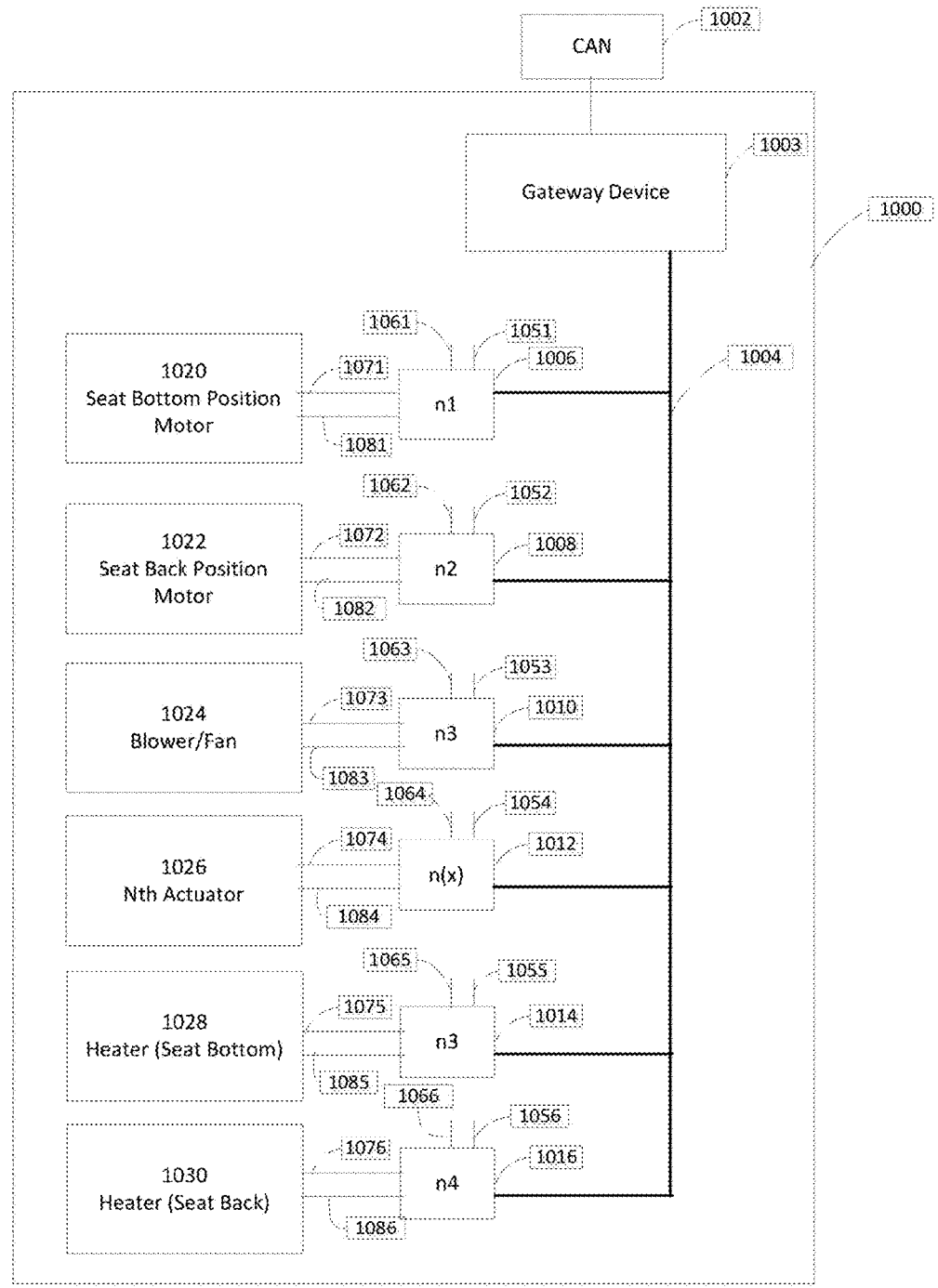
FIG. 10 is a schematic illustration of another embodiment of a distributed control architecture for climate control load devices for a vehicle seat.

FIG. 10 is a schematic diagram that illustrates one embodiment of a distributed control architecture 1000 for a vehicle seat. Similar to the architecture 100 shown in FIG. 1, the distributed control architecture 1000 can include a gateway device 1003 that communicates with a CAN protocol control module 1002 at another location within the vehicle, a bus 1004, and a plurality of nodes 1006, 1008, 1010, 1012, 1014, 1016. While six nodes and six load devices are shown in FIG. 10, other configurations can include fewer nodes or load devices or 5, 6, 7, 8, 9, 10, or more nodes or load devices in communication with the gateway device 1003. In addition, one or more of the load devices can be combined into single load device and/or arranged as described above in which one load device can control another load device. Each of the nodes 1006, 1008, 1010, 1012, 1014, 1016 can be connected to a load device 1020, 1022, 1024, 1026, 1028, 1030. In some embodiments, each of the load devices 1020, 1022, 1024, 1026, 1028, 1030 can contain logic specific to the load device to which the node is connected. In other embodiments, such as the embodiment shown in FIG. 10, each of the nodes 1006, 1008, 1010, 1012, 1014, 1016 can contain logic specific to the load device to which the node is connected. The nodes 1006, 1008, 1010, 1012, 1014, 1016 can include instructions specific to the load device, such as timing for operation of a blower or thermoelectric module, priority of operations, etc. The nodes 1006, 1008, 1010, 1012, 1014, 1016 can transfer control signals 1071, 1072, 1073, 1074, 1075, 1076 to the respective load devices 1020, 1022, 1024, 1026, 1028, 1030 and receive feedback signals 1081, 1082, 1083, 1084, 1085, 1086 from the respective load devices 1020, 1022, 1024, 1026, 1028, 1030. Each of the nodes 1006, 1008, 1010, 1012, 1014, 1016 can include a ground connection 1051, 1052, 1053, 1054, 1055, 1056 and a power connection 1061, 1062, 1063, 1064, 1065, 1066. The bus 1004 can operate with the LIN protocol while the gateway device 1003 acts as the interface between the vehicle control system and the load devices.

Figure 11:
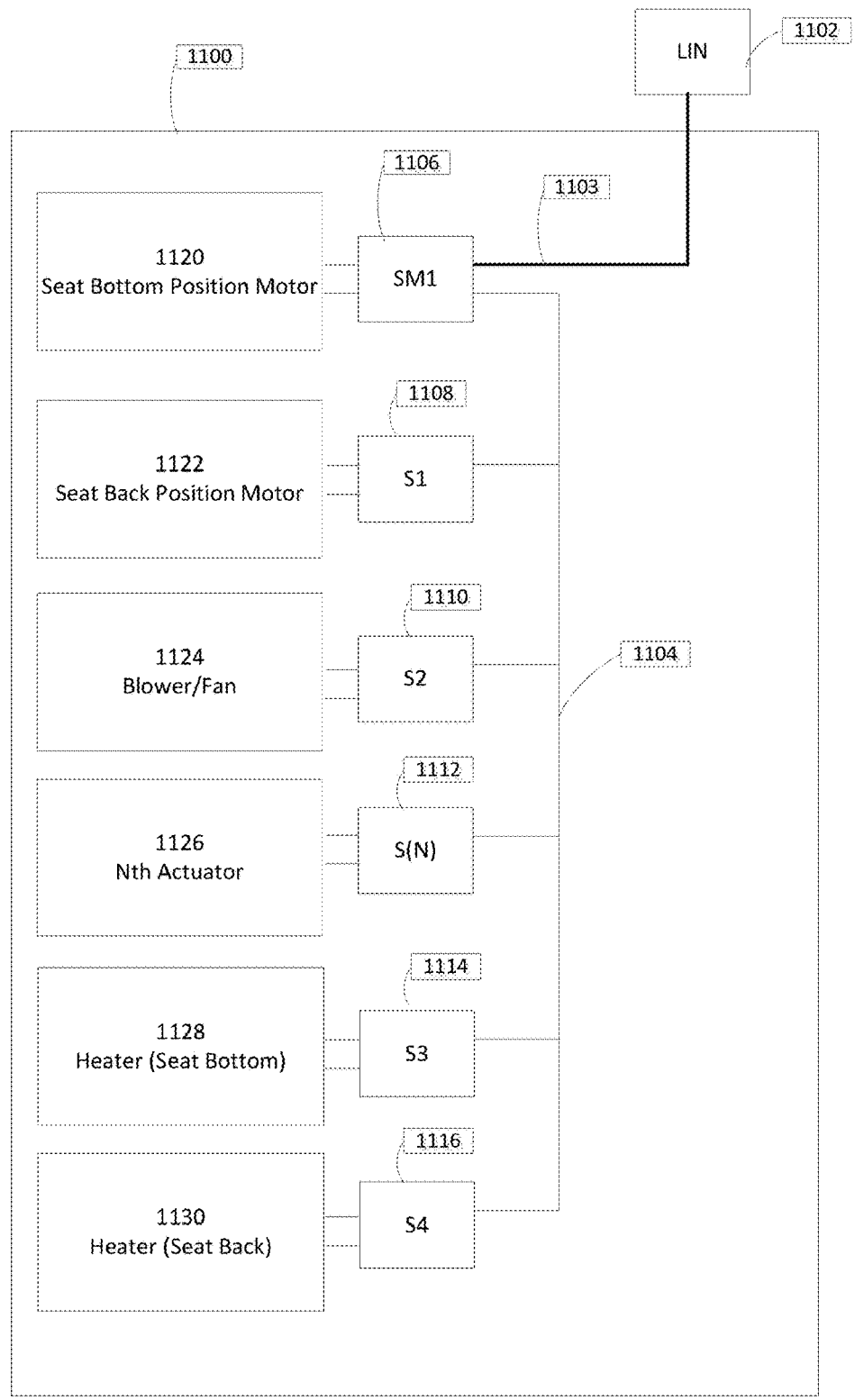
FIG. 11 is a schematic illustration of another embodiment of a distributed control architecture for climate control load devices for a vehicle seat with a master device and a plurality of slave devices.

As discussed above, one limitation of the currently available LIN protocol is that it can define a maximum of 16 slave nodes on the bus. To exceed this limitation of nodes, each or a subset of the loads can be provided with a separate slave device (that is, if there are two loads 2 per seat) and the bus is shared with other functions. In other embodiments, the gateway device may be designed with an additional and separate LIN bus to allow for more nodes to be connected to the gateway device. As shown in FIG. 11, in one arrangement, this limitation can be overcome by making the first device a LIN slave to the vehicle and a LIN master to the other devices. In one embodiment, the system 1100 can include a gateway device 1102 that is connected via a bus 1103 to a first node 1106. The first node 1106 can be connected to a load 1120 for a seat bottom position motor. The load 1120, via node 1106, then acts as the master to send control signals via a second bus 1104 to slave load devices 1122, 1124, 1126, 1128, 1130 that are connected to the second bus 1104 via the nodes 1108, 1110, 1112, 1114, 1116. The load device 1120 can act as a master to up to 16 slave nodes. In FIG. 11, the master load device 1120 acts as a master to five separate slave devices 1122, 1124, 1126, 1128, 1130 that are each connected to the bus 1104 via the nodes 1108, 1110, 1112, 1114, 1116. The slave devices can comprise any of a variety of load devices such as, for example, a seat back position motor, a blower/fan for a thermoelectric device, any number of other actuators, a seat bottom heater, and a seat back heater. This adds one pin to the node 1106 of the load device 1120 as it now has two LIN channels. The LIN slave bus 1104 in this configuration might also be a proprietary serial bus (UART) and which can realize some savings on the physical interface. While FIG. 11 illustrates a master load device and five slave load devices, any number of slave load devices up to the specification limitation of 16 may be used.

In the various embodiments discussed above, the controller may be a computer and/or may include one or more processors, circuits, one or more memories, and/or one or more communication mechanisms. In some embodiments, more than one controller or computer may be used to execute the modules, methods, and processes discussed herein. Additionally, the modules and processes herein may each run on one or multiple processors, on one or more computers; or the modules herein may run on dedicated hardware. The controller may include or be in electrical communication with control modules of a thermal system. The controller may receive this or other input from the control modules and respond by adjusting or otherwise controlling one or more components in various regions. The controller maybe in wired or wireless communication to send and/or receive data to/from the various components with which the controller is coupled.

Specifically, considering the many electronic system features and options that may be possible for a vehicle seat, in some configurations, such as those shown in FIGS. 1-11, a complete seat system includes one module that is the master and all the other functions or load devices are LIN slaves. This may result in a significant reduction in wiring compared to current designs and provides the ultimate in flexibility of option content for the manufacturer. The memory seat modules 300 and 400, shown in FIGS. 3-4, are examples of a module which can be the master because this module is generally always present in the high end seats. However, in other configurations, another component may be the master.

Various advantages can be realized through use of a distributed control architecture such as those described in FIGS. 1-11. Such advantages can include wiring reduction, a common hardware interface for all climate comfort functions, vehicle feature flexibility, package protected for Heat/Cool, Heat/Vent, and/or Vent Only, allowing for mid cycle enhancements (or new introductions) via software change only, automatic recognition of loads via software, common seat package, various performance improvements, a scalable architecture that allows for expansion to other interior comfort solutions, manufacturer-maintained control of high level functionality for vehicle implementation, and single system provider with improved accountability.

To assist in the description of the disclosed embodiments, words such as top, bottom, front, rear, left, right, sides, above, and below may have been used describe the accompanying figures. Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide. It will be appreciated, however, that the illustrated embodiments can be located and oriented in a variety of desired positions.

Although the foregoing description of the preferred embodiments has shown, described, and pointed out certain novel features, it will be understood that various omissions, substitutions, and changes in the form of the detail of the apparatus as illustrated, as well as the uses thereof, may be made by those skilled in the art without departing from the spirit of this disclosure. Consequently, the scope of the present disclosure should not be limited by the foregoing discussion, which is intended to illustrate rather than limit the scope of the disclosure.

What is claimed is:

1. A distributed control system for a vehicle seat, comprising:
   a control module for communicating on a single communication bus; and
   a plurality of load devices connected to the control module via the single communication bus, wherein each of the plurality of load devices is directly connected to the single communication bus that is connected to the control module,
   wherein each of the plurality of load devices comprises a logic component specific to the load device, and
   wherein the control module comprises an input/output device that receives messages, extracts relevant signals, and passes the relevant signals through the single communication bus to the plurality of load devices.

2. The control system of claim 1, wherein a load device of the plurality of load devices comprises one of a blower, a motor, a thermoelectric device, and an auxiliary heating component.

3. The control system of claim 1 further comprising no more than 16 nodes.

4. The control system of claim 1, wherein the logic component of each load device includes instructions specific to the connected load device.

5. The control system of claim 1, wherein one of the plurality of load devices is a master load device and an other plurality of load devices are slave devices to the master load device.

6. The control system of claim 5, wherein slave devices are directly connected to the control module via the single communication bus.

7. The control system of claim 5, wherein the slave devices are connected to the control module through the master load device.

8. The control system of claim 7, wherein the master load device comprises a controller configured to send control signals to the slave devices.

9. The control system of claim 1, wherein at least one of the load devices includes a sensor and the logic component of the at least one of the load devices utilizes information from the sensor to control the load device.

10. The control system of claim 1, wherein the control module has a single connection to the single communication bus to connect with the plurality of load devices through the single communication bus.

11. A distributed control system for a vehicle seat, comprising:
    a control module for communicating on a single communication bus;
    a plurality of nodes connected to the control module via the single communication bus, wherein each of the plurality of nodes is directly connected to the single communication bus that is connected to the control module;
    a plurality of load devices connected to the plurality of nodes; and
    one or more sensors connected to one or more of the plurality of load devices, the one or more sensors providing feedback signals to one or more of the plurality of nodes,
    wherein each of the plurality of nodes comprises a logic component specific to the load device.

12. The control system of claim 11, wherein one of the plurality of nodes is a master node and an other plurality of nodes are slave nodes to the master node.

13. The control system of claim 12, wherein the slave nodes are connected to the control module through the master node.

14. The control system of claim 11, wherein the logic component of each node includes instructions specific to the connected load device.

15. The control system of claim 11, wherein one or more of the load devices comprises a thermoelectric device.

16. The control system of claim 11, wherein the load device comprises one of a motor, a blower, a fan, an actuator, or a heater.

17. The control system of claim 11, wherein each of the plurality of nodes connect to a ground connection and a power connection.

18. The control system of claim 11, wherein the one or more sensors are connected to one or more of the plurality of load devices through the control module.

19. A method for controlling the operation of load devices associated with a vehicle seat, comprising:
    registering a user input on a mode of operation;
    sending a control signal comprising the mode of operation to a control module;
    distributing the control signal on a bus to a plurality of load devices or plurality of nodes each connected to a load device, wherein each of the plurality of load devices or the plurality of nodes is directly connected to the bus that is connected to the control module;
    acknowledging the control signal at a desired controlled load device or node; and
    initiating operation of the load device in response to the user input.

20. The method of claim 19, wherein the plurality of load devices comprises a master load device an other plurality of load devices are slave devices, each of the plurality and the other plurality of load devices comprising at least one sensor that reports diagnostic feedback to the master load device via a communication bus.

21. The method of claim 19, wherein the plurality of load devices are a plurality of LIN-controlled load devices, and wherein the control signal is distributed on a LIN-bus.

* * * * *